United States Patent [19]
Gavin

[11] Patent Number: 6,015,488
[45] Date of Patent: Jan. 18, 2000

[54] FILTER SYSTEM FOR SEPTIC TANK

[76] Inventor: Norman W. Gavin, 2545 Ridge Rd., Hamden, Conn. 06473

[21] Appl. No.: 09/189,930

[22] Filed: Nov. 12, 1998

Related U.S. Application Data

[63] Continuation-in-part of application No. 08/823,868, Mar. 25, 1997, Pat. No. 5,871,640.
[51] Int. Cl.⁷ ...................................................... B01D 29/33
[52] U.S. Cl. .......................... 210/123; 210/234; 210/235; 210/256; 210/299; 210/429; 210/441; 210/532.2
[58] Field of Search ..................................... 210/123, 170, 210/234, 235, 238, 256, 299, 308, 311, 316, 323.2, 335, 339, 418, 429, 441, 461, 470, 494.1, 498, 532.2

[56] References Cited

U.S. PATENT DOCUMENTS

| | | |
|---|---|---|
| 19,030 | 1/1858 | Ingram . |
| 1,902,171 | 3/1933 | Kopp . |
| 2,364,472 | 12/1944 | Piatt . |
| 2,591,248 | 4/1952 | Francois . |
| 2,606,663 | 8/1952 | Blackman et al. . |
| 2,684,763 | 7/1954 | Siskavitch . |
| 2,767,801 | 10/1956 | Eads . |
| 2,900,084 | 8/1959 | Zabel . |
| 3,025,962 | 3/1962 | Williams . |
| 3,272,337 | 9/1966 | Elwell . |
| 3,332,552 | 7/1967 | Zabel . |
| 3,390,778 | 7/1968 | Uhen . |
| 3,612,279 | 10/1971 | Hostetter . |
| 3,630,370 | 12/1971 | Quina . |
| 3,662,890 | 5/1972 | Grimshaw . |
| 3,954,612 | 5/1976 | Wilkerson . |
| 4,082,676 | 4/1978 | Dulger . |
| 4,172,799 | 10/1979 | Perry, Jr. . |
| 4,179,372 | 12/1979 | Rosaen . |
| 4,207,631 | 6/1980 | Baggey . |
| 4,278,455 | 7/1981 | Nardi . |
| 4,319,998 | 3/1982 | Anderson . |
| 4,348,278 | 9/1982 | Caccia . |
| 4,439,323 | 3/1984 | Ball . |
| 4,465,594 | 8/1984 | Laak . |
| 4,552,662 | 11/1985 | Webster et al. . |
| 4,673,494 | 6/1987 | Krofta . |
| 4,699,715 | 10/1987 | Lee, II . |
| 4,710,295 | 12/1987 | Zabel . |
| 4,715,966 | 12/1987 | Bowman . |
| 4,818,384 | 4/1989 | Mayer . |
| 4,832,846 | 5/1989 | Gavin . |
| 4,867,871 | 9/1989 | Bowne . |
| 4,895,645 | 1/1990 | Zorich, Jr. . |
| 4,931,180 | 6/1990 | Darchambeau . |
| 4,971,690 | 11/1990 | Justice . |
| 5,032,287 | 7/1991 | Salmond . |

(List continued on next page.)

FOREIGN PATENT DOCUMENTS 14434  7/1895  United Kingdom .

Primary Examiner—Christopher Upton
Attorney, Agent, or Firm—Robert A. Seemann

[57] ABSTRACT

A filter housing having a bracket for attaching the housing to a septic tank outlet port and adapted for fluid flow connection to an outlet port on the housing, contains a removable filter element having an outlet port connected to the outlet port on the housing and an opening in the lower end of the housing for delivering septic tank fluid to the filter, and includes a seal element buoyantly responsive closingly to fluid in a septic tank when the filter housing is mounted in a septic tank, operatively connected to the filter element for closing the open lower end of the filter housing and forming a temporary second filter at the lower open end when the filter element is removed from the filter housing.

8 Claims, 15 Drawing Sheets

U.S. PATENT DOCUMENTS

| | | |
|---|---|---|
| 5,106,493 | 4/1992 | McIntosh . |
| 5,198,113 | 3/1993 | Daniels . |
| 5,207,896 | 5/1993 | Graves . |
| 5,242,584 | 9/1993 | Hoarau . |
| 5,252,000 | 10/1993 | Mohs . |
| 5,264,120 | 11/1993 | Graves . |
| 5,281,332 | 1/1994 | Vandervelde et al. . |
| 5,308,479 | 5/1994 | Iwai et al. . |
| 5,360,556 | 11/1994 | Ball et al. . |
| 5,382,357 | 1/1995 | Nurse . |
| 5,387,335 | 2/1995 | Iwai et al. . |
| 5,427,679 | 6/1995 | Daniels . |
| 5,480,561 | 1/1996 | Ball et al. . |
| 5,482,621 | 1/1996 | Nurse . |
| 5,492,635 | 2/1996 | Ball . |
| 5,531,891 | 7/1996 | vonMeier . |
| 5,531,894 | 7/1996 | Ball et al. . |
| 5,569,387 | 10/1996 | Bowne et al. . |

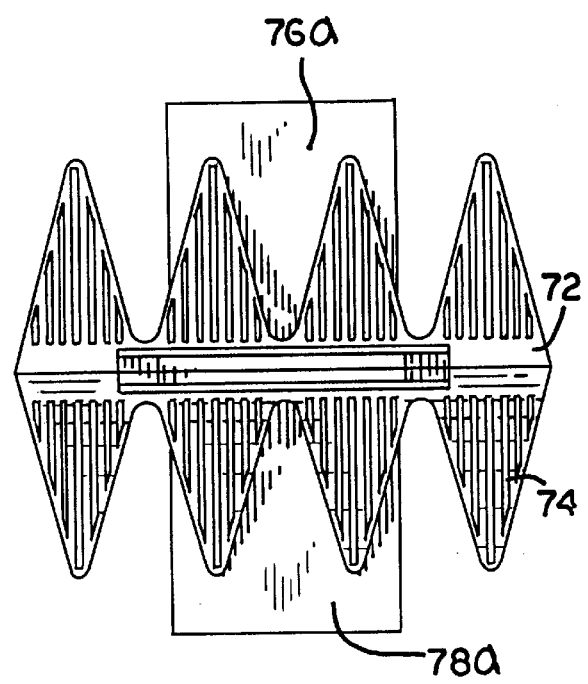
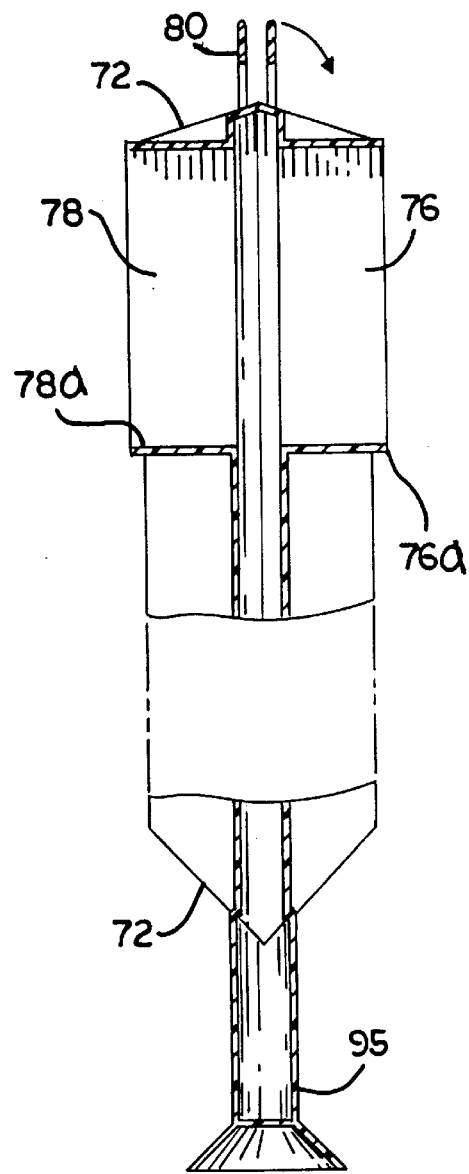
FIG. 7
FIG. 8

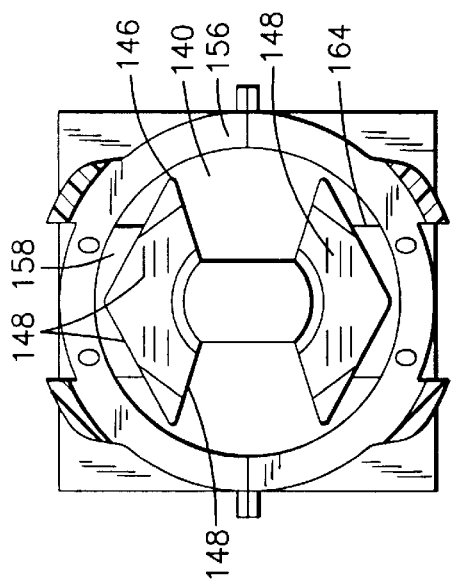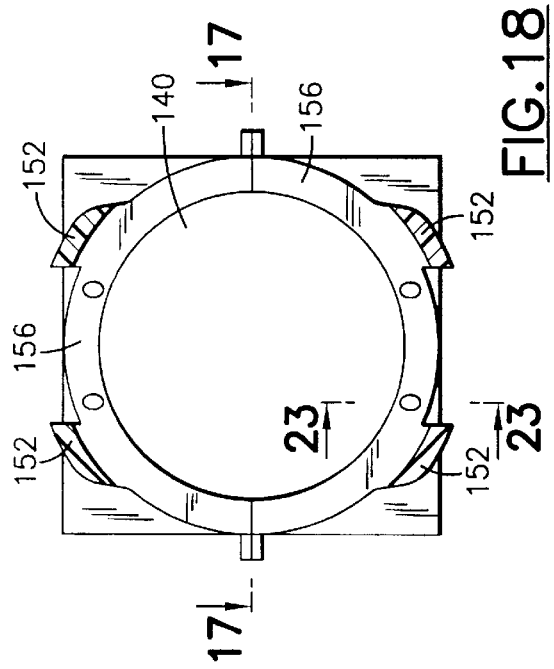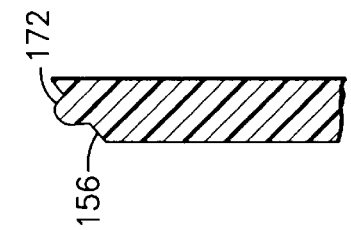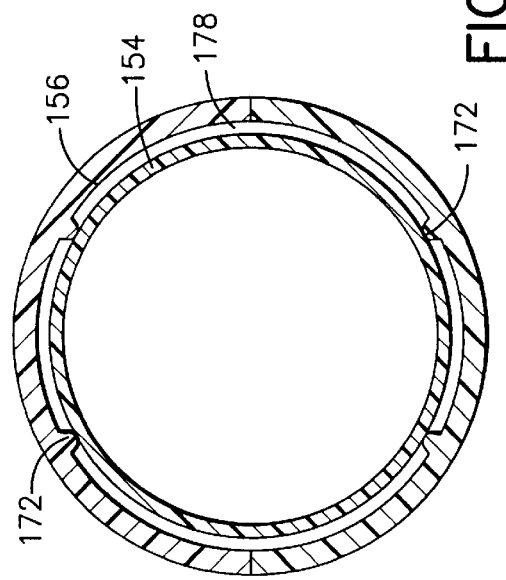

FILTER SYSTEM FOR SEPTIC TANK

This application is a continuation-in-part of U.S. patent application Ser. No. 08/823,868, filed Mar. 25, 1997, now U.S. Pat No. 5,871,640.

BACKGROUND OF THE INVENTION

The present invention pertains to septic systems and, more particularly, to a filter system for use in a septic system tank.

Domestic septic systems generally include a boxlike underground concrete tank into which wastes are deposited and where they are subjected to bacterial action. Normally, the tank is partly filled with liquid on top of which floats a so-called "scum layer" of solid and semi-solid waste matter. The vertical location of the scum layer changes over time as the amount of liquid in the tank fluctuates. A second layer of solid or semi-solid matter rests on the bottom of the tank.

Liquid from the tank is passed to an underground distribution box where the flow is divided between a number of underground feeder lines. The feeder lines distribute the liquid throughout a leach field, allowing it to ultimately return to the water table.

In order to avoid clogging of the feeder line openings or damage to the leach field, it is important that the scum and other solid or semi-solid matter be retained in the tank and prevented from entering into the liquid distribution system. To some extend, this may be accomplished by placement of the tank outlet in the comparatively clear liquid beneath the scum layer and above the tank bottom. However, due to the ever changing location of the scum level, this solution can not be wholly successful. Attempts have also been made to filter the liquid leaving the tank. Such attempts are ultimately frustrated, however, by scum clogging the filter pores.

Accordingly, it is an object of the present invention to provide a novel filter system for use in a septic system tank which effectively filters outflow from the tank while avoiding clogging.

It is also an object to provide such a filter system which may be used in septic systems of differing capacities and flow rates.

Another object is to provide such a filter system which is inexpensive to fabricate and readily installed in the tank.

Still another object is to provide such a filter system wherein the filter may be readily removed for cleaning or replacement.

SUMMARY OF THE INVENTION

It has now been found that the foregoing and related objects may be readily attained in a septic tank filter system comprising a mounting member adapted for attachment to an interior surface of a septic system tank, at least one filter housing fixed to the mounting member, and a hollow foraminated filter nested in each filter housing. The filter housing is open at both ends and has an elongated, generally cylindrical side wall with an outlet port. It is disposed with its open ends in vertical alignment.

The filter has a first conduit providing a fluid flow connection between the filter interior and the filter housing outlet port. The mounting member provides a fluid flow connection between the filter housing outlet port and an outlet in the septic tank wall.

Filtrate from the filter interior follows through the first conduit, then through the filter housing outlet port, thence through the mounting member, finally exiting the tank through the septic tank outlet.

Advantageously, a weakening or score line in the filter housing side wall permits ready removal of a section thereof to form an inlet port. Telescoping channel members on the outside of the filter housings allow them to be interconnected with the outlet port of one in fluid flow connection with the inlet port of another. A second conduit in the filter provides fluid flow communication between the filter housing inlet port and the filter interior. It is thus possible to increase the capacity of the system by joining two or more filter housings, each with a filter nested therein.

Preferably, a closure device operatively connected to the filter closes the open lower end of the filter housing when the filter is removed. In one embodiment, this closure device comprises a buoyant member adapted to substantially block fluid flow through the lower open end of the filter housing and a rod projecting from the bottom of the filter and engageable with the buoyant member to maintain the buoyant member in spaced relation to the opening.

In one embodiment, the filter system includes a gas deflector fixed to the filter housing below its lower open end.

Desirably, each filter comprises a pair of spaced apart walls of generally saw-tooth configuration, each wall having a plurality of rows of parallel slits, advantageously, a filter handle protruding from the open upper end of the filter housing facilitates filter removal for replacement or cleaning.

BRIEF DESCRIPTION OF THE DRAWINGS

FIG. 7 is a top view of the filter of FIG. 5.

FIG. 8 is a cross sectional view taken along line 8—8 of FIG. 5.

FIG. 18 is a cross sectional view taken along line 18—18 of the filter housing of FIG. 17 with both halves of the filter housing joined together.

FIG. 19 is an end view of a filter element installed in the filter housing of FIG. 18.

FIG. 22 is a cross sectional view of the seal between the buoyant sealing element and the seal opening in the filter housing with both halves of the filter housing joined together, taken along line 22—22 of FIG. 21.

FIG. 23 is a cross sectional enlarged view of the seal face of the seal opening in the filter housing taken along line 23—23 of FIG. 18.

DETAILED DESCRIPTION OF THE PREFERRED EMBODIMENT

Figure 1:
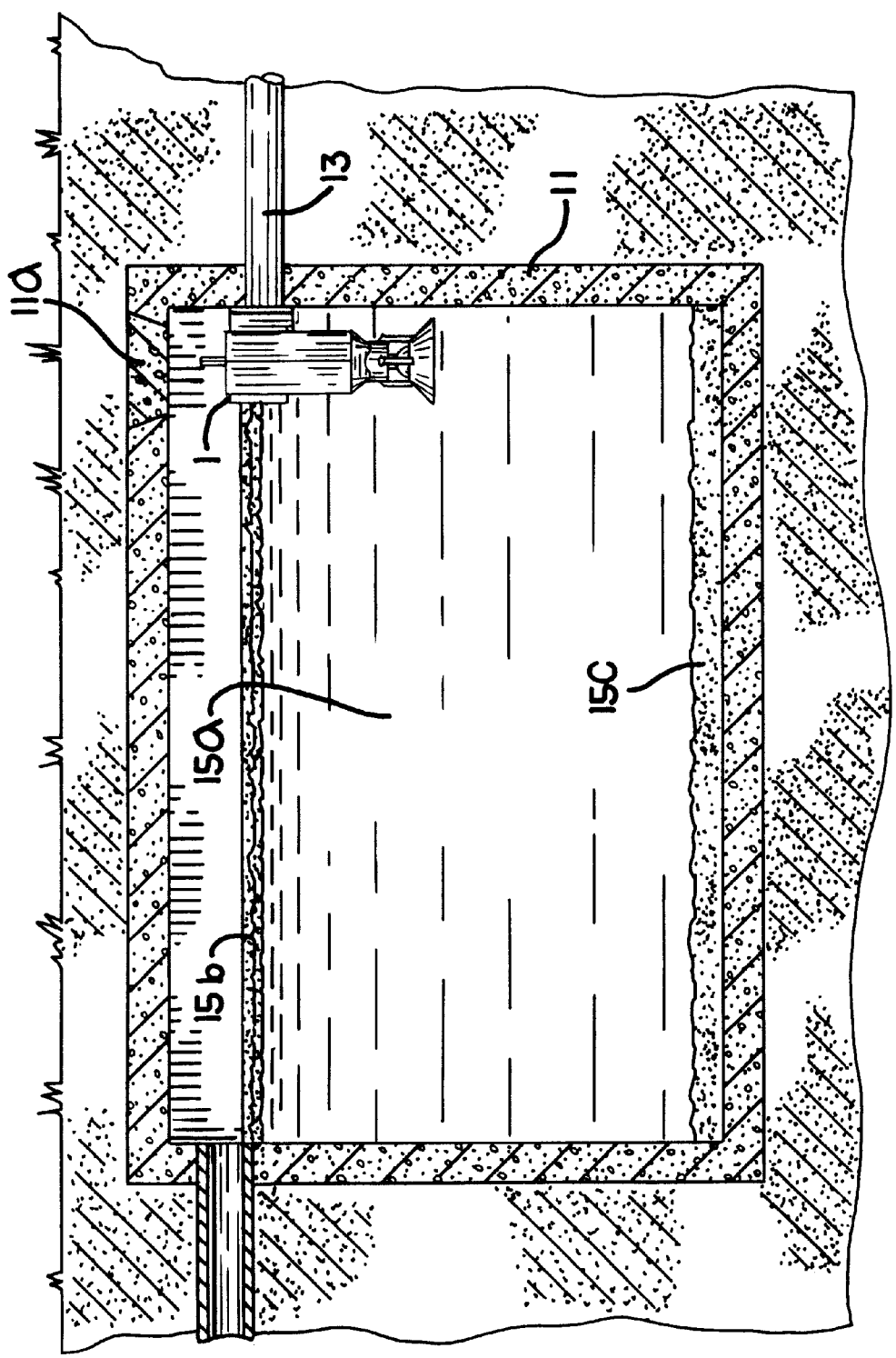
FIG. 1 is a cross sectional view of a typical septic system tank illustrating the placement of a filter system in accord with the present invention.
Figure 2:
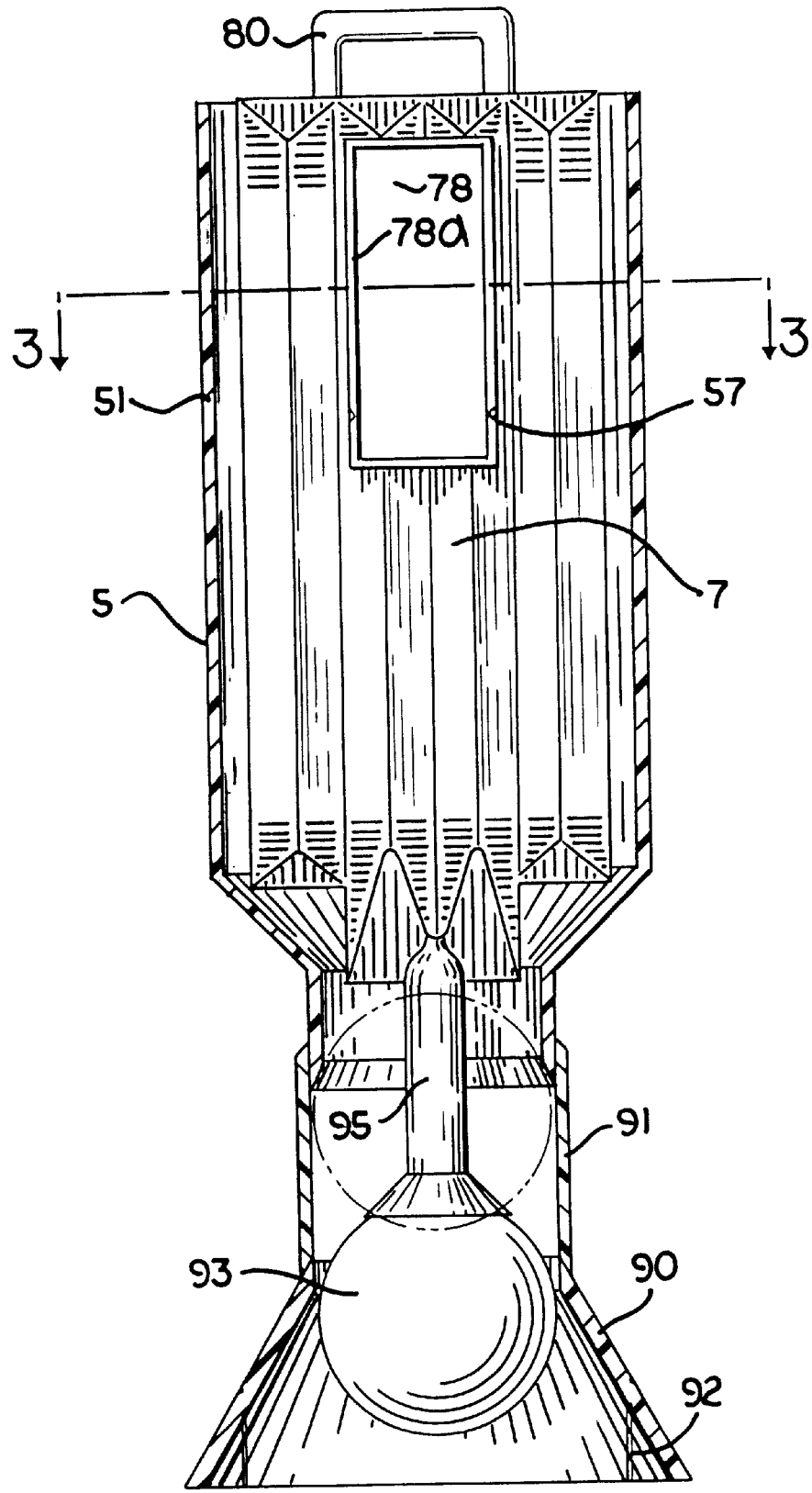
FIG. 2 is a vertical cross sectional view of a filter system in accord with the present invention.

Turning first to FIG. 1 of the attached drawings, therein illustrated is a septic tank filter system embodying the present invention and generally designated by the numeral 1. The filter system is disposed inside septic tank 11, attached to the tank wall in covering relation to tank outlet pipe 13. Typically, tank 11 is partly filled with liquid 15a on top of which floats a scum layer of solid and semi-solid waste matter 15b. A second scum layer 15c rests on the bottom of tank 11. Ideally, outlet pipe 13 is at a level between the two scum layers 15b and 15c. However it is to be noted that the vertical location of upper layer 15b changes over time as the amount of liquid 15a in tank 11 fluctuates.

Figure 3:
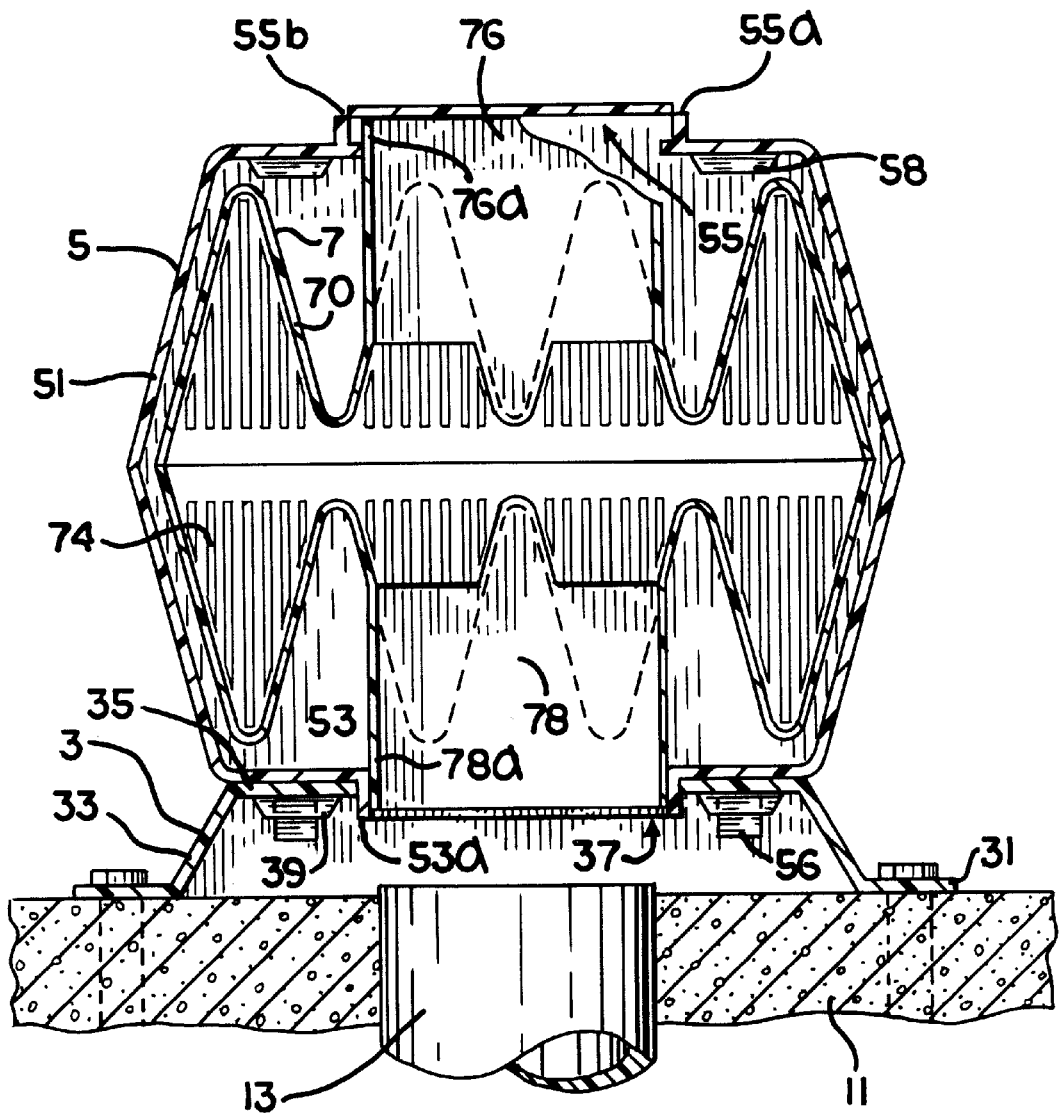
FIG. 3 is a cross sectional view taken along line 3—3 of FIG. 2.
Figure 4:
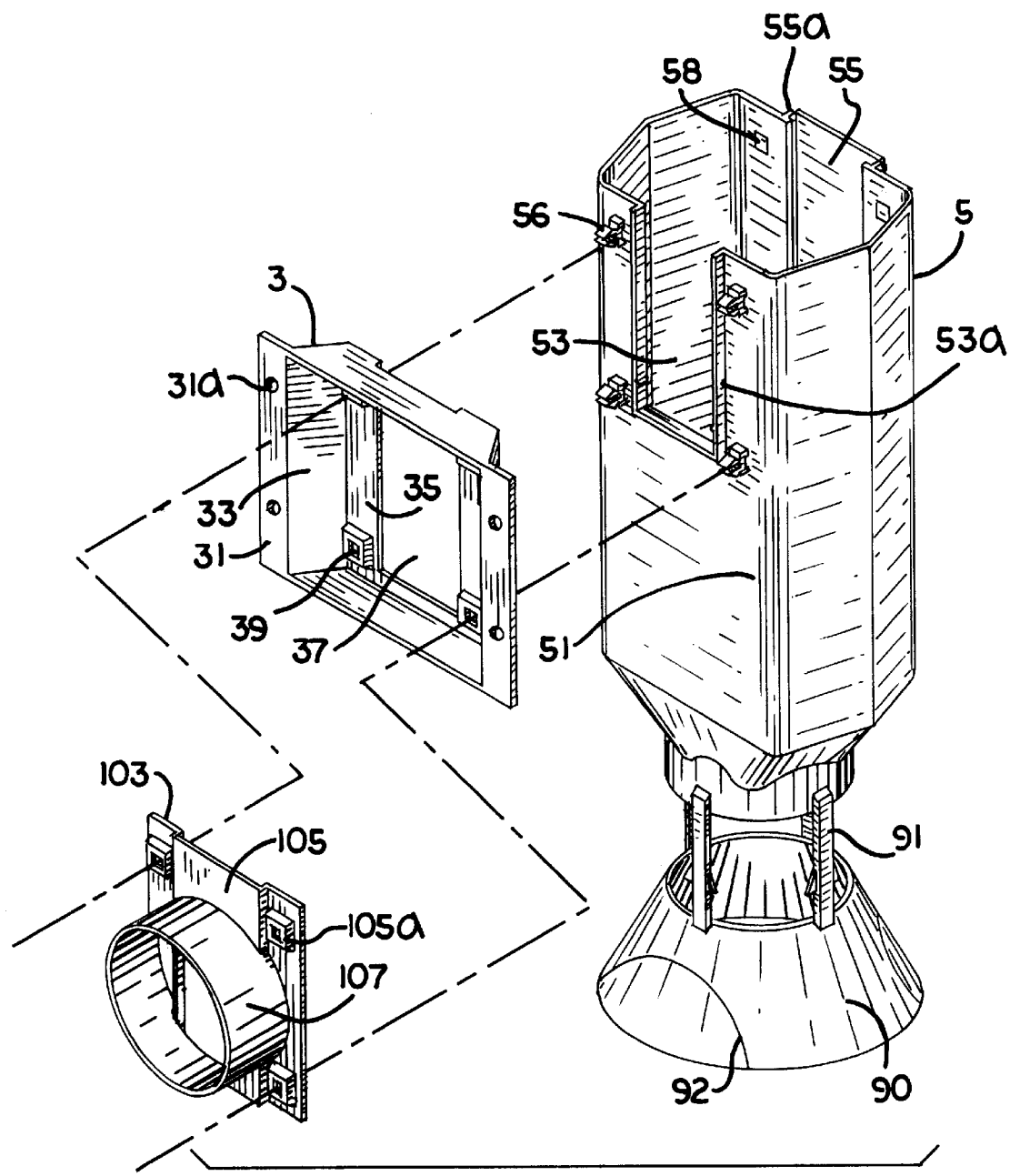
FIG. 4 is a perspective view of a filter housing and two embodiments of mounting members in accord with the present invention.
Figure 5:
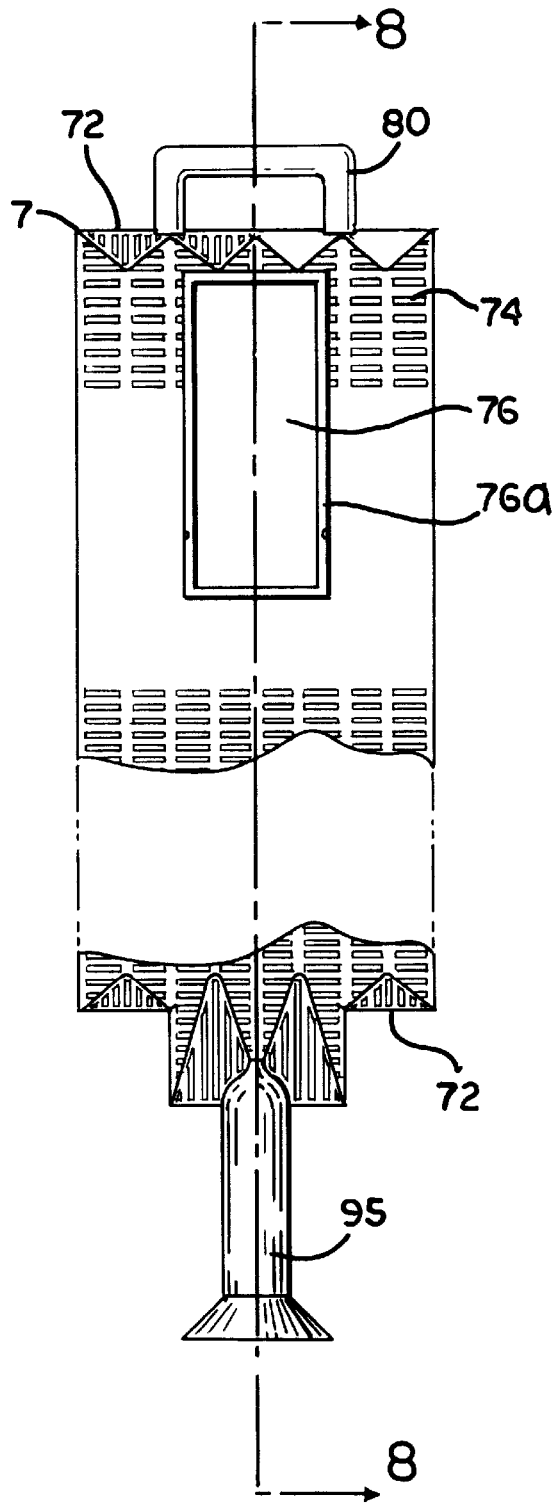
FIG. 5 is a front view of a filter in accord with the present invention.
Figure 6:
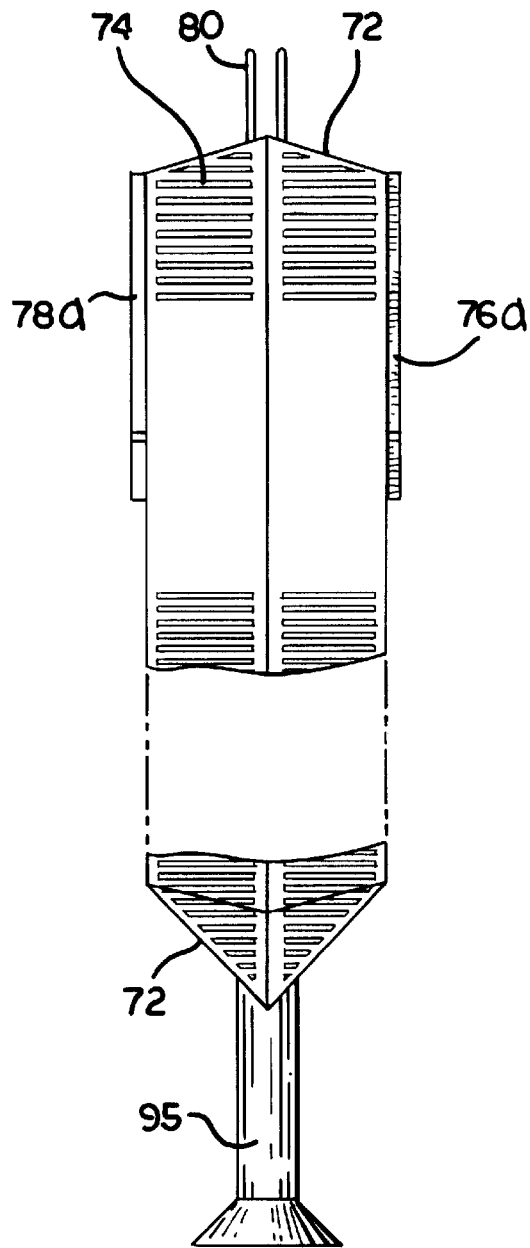
FIG. 6 is a side view of the filter of FIG. 5.
Figure 11:
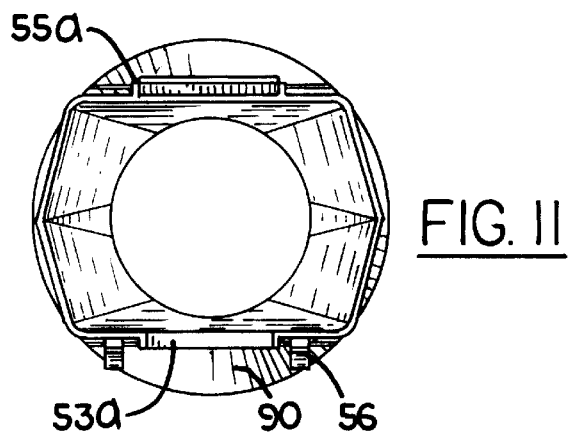
FIG. 11 is a top view of the filter housing of FIG. 4.
Figure 9:
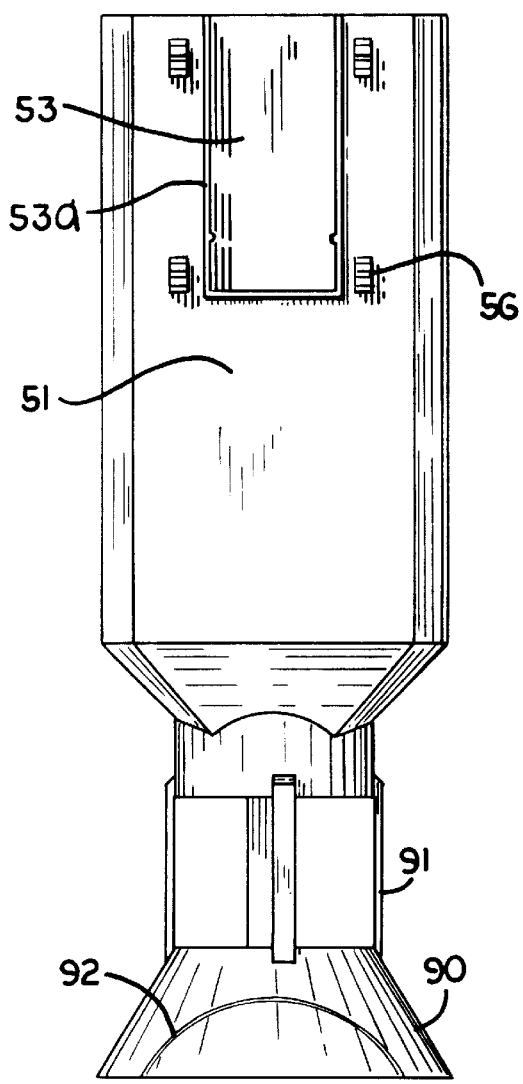
FIG. 9 is a front view of the filter housing of FIG. 4.
Figure 10:
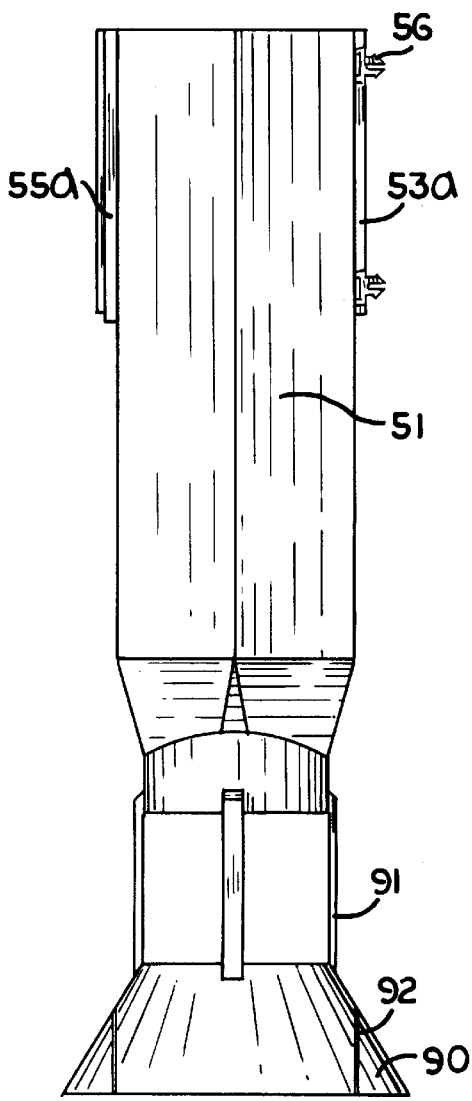
FIG. 10 is a side view of the filter housing of FIG. 4.

As best seen in FIG. 3, filter system 1 comprises a mounting member 3, a filter housing 5 fixed to mounting member 3, and a filter 7 nested in filter housing 5.

Mounting member 3 includes a base 31, which is screwed or otherwise mechanically attached to an inner wall surface of tank 11, and a generally pyramidal wall 33 joined to base 31. Mounting member 3 surrounds the tank outlet pipe 13 which is in fluid flow communication with the mounting member interior. Parallel to mounting member base 31 is a top wall 35 having at its center, a rectangular inlet port 37.

Filter housing 5 has an elongate, generally cylindrical sidewall 51 open at both ends. An outlet port 53 is formed in sidewall 51. A flange 53a, which runs along the sides and bottom of outlet port 53 on the exterior of sidewall 51, is telescopically received by the edge of mounting member inlet port 37. Proximate the corners of outlet port 53 are four resilient capture members 56 which are engageable with four recessed apertures 39 in the mounting member top wall 35 to fix filter housing 5 to mounting member 3.

Mounting member 3 and filter housing 5 are arranged such that filter housing 5 may be readily and conveniently slid into place in mounting member 3, after the latter has been fastened to the tank wall. To facilitate fabrication of filter housing 5, outlet port 53 may be located at an upper edge of sidewall 51 such that it comprises a generally U-shaped cutout, open at the top. If desired, the filter system capacity may be increased by connecting, in series, two or more filter units, each comprising a filter housing 5 with a filter 7 nested therein. To this end, a section of sidewall 51 defined by a score line or weakening line 55b is removable to form an inlet port 55. Inlet port 55 formed by removal of the defined sidewall section is opposite outlet port 53 and, like outlet port 53, is bordered by a flange 55a. Proximate the corners of inlet port 55 are four recessed apertures 58 which are preferably sealed by a readily burstable membrane.

Figure 16:
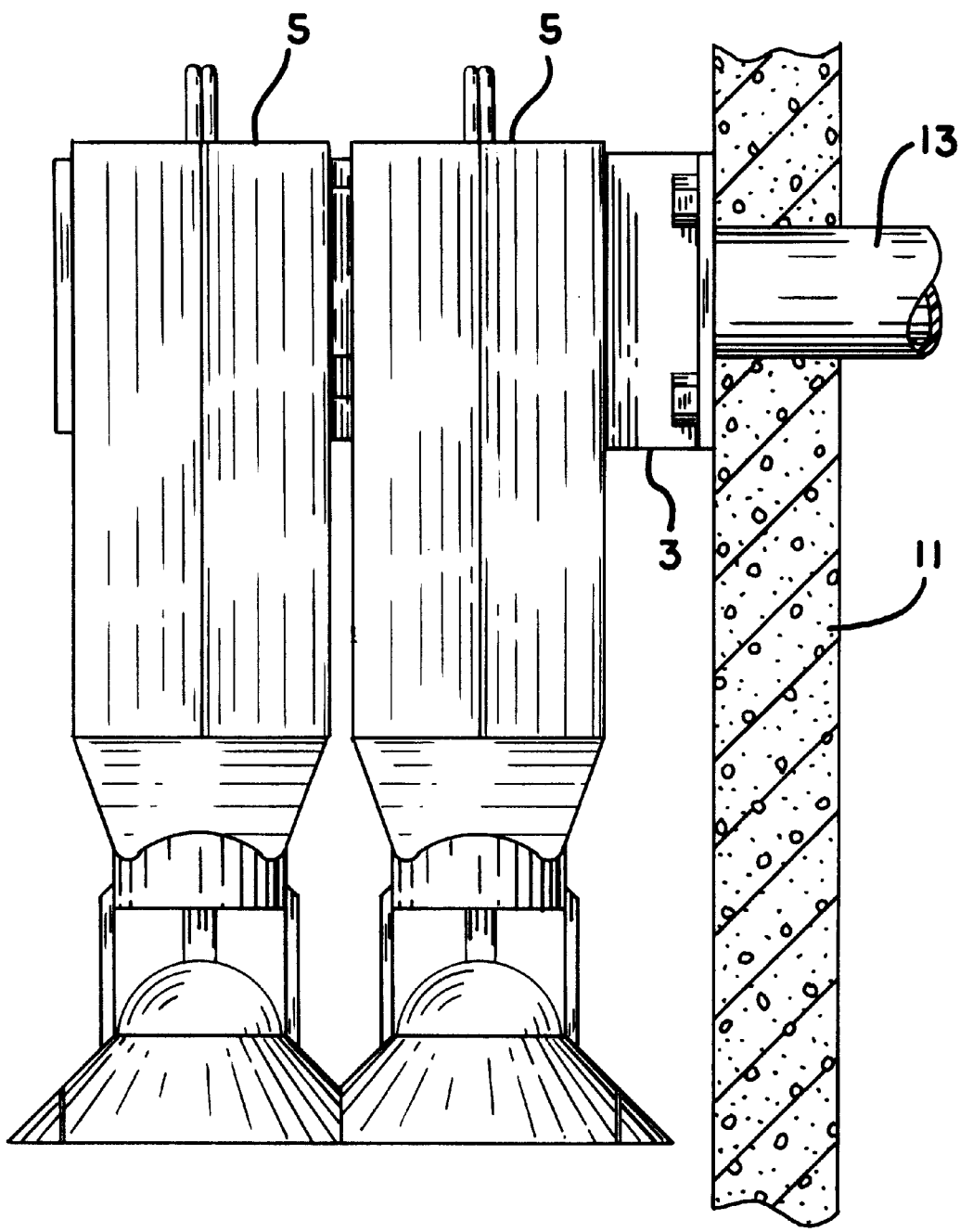
FIG. 16 is a side view of two filter housings joined together.

To operatively connect two filter housings as illustrated in FIG. 16, the defined section of sidewall 51 of one is first removed so as to open or create inlet port 55. Outlet port flange 53a of a second filter housing is then inserted into the inlet port 55 thus created. During this insertion, capture members 56 on the second filter housing pierce the covering membranes and enter apertures 58 of the first filter housing thereby fastening the two filter housings together. If desired, a third filter housing may be attached to the second in the same manner.

Filter 7, which is illustrated in FIGS. 5–8, is a hollow member having sidewalls 70 of a generally sawtooth configuration. Sidewalls 70 and end walls 72 are formed with a number of rows of narrow, parallel slits 74. Near the top of filter 7 and communicating with its interior, are opposed generally square inlet and outlet ports 76 and 78 which are in fluid flow communication. If multiple filter units are connected in series, filtrate from one unit may enter the filter inlet port 76 of an adjacent unit, pass directly through filter 7, and exit through outlet port 78. Ports 76 and 78 are framed by projecting flanges 76a and 78a which are slidingly received in the filter housing outlet and inlet ports 53 and 55 respectively when filter 7 is inserted into filter housing 5.

Projections 57 on the filter housing flanges 53a and 55a are received in detents in the filter flanges 76a and 78a to lock filter 7 into filter housing 5 and prevent it floating out of position. A two-part folding handle 80 on the top of filter 7 protrudes from the open upper end of filter housing 5 and facilitates filter removal for replacement or cleaning.

Handle 80 is foldable between an upright position, wherein it may be readily grasped and a folded position, wherein it lies substantially parallel to end wall 72 of filter 7, permitting closure of access hatch 11a of tank 11.

The biological processes occurring at the bottom of septic tank 11 generate gas bubbles which float upward through liquid 15, often carrying sizable chunks of entrained particulate matter. If allowed to proceed unchecked, the bubbles will enter filter housing 5 and deposit the particulates on filter 7, soon clogging it. To avoid this problem, a frustoconical gas deflector 90 is fastened to filter housing 5 below its open lower end. Deflector 90 is carried on four support straps 91 which depend from filter housing 5. A pair of parallel weakening lines or score lines 92 are formed in the gas deflector 90 to facilitate removal of chordal sections thereof which is necessary when filter units are to be serially fastened together.

Buoyant ball 93 is loosely captured between gas deflector 90 and filter housing 5 and within the circle of support straps 91. If left unhindered, ball 93 would float upward and seal the lower opening of filter housing 5. It is however, maintained in spaced relation to housing 5 by a protruding rod 95 fixed to the bottom of filter 7. Filter 7 and its attached rod 95 prevent ball 93 from sealing the lower end of the filter housing 5. If filter 7 is removed from housing 5, housing 5 is sealed by ball 93, thereby preventing unfiltered sewage from escaping tank 11.

Figure 12:
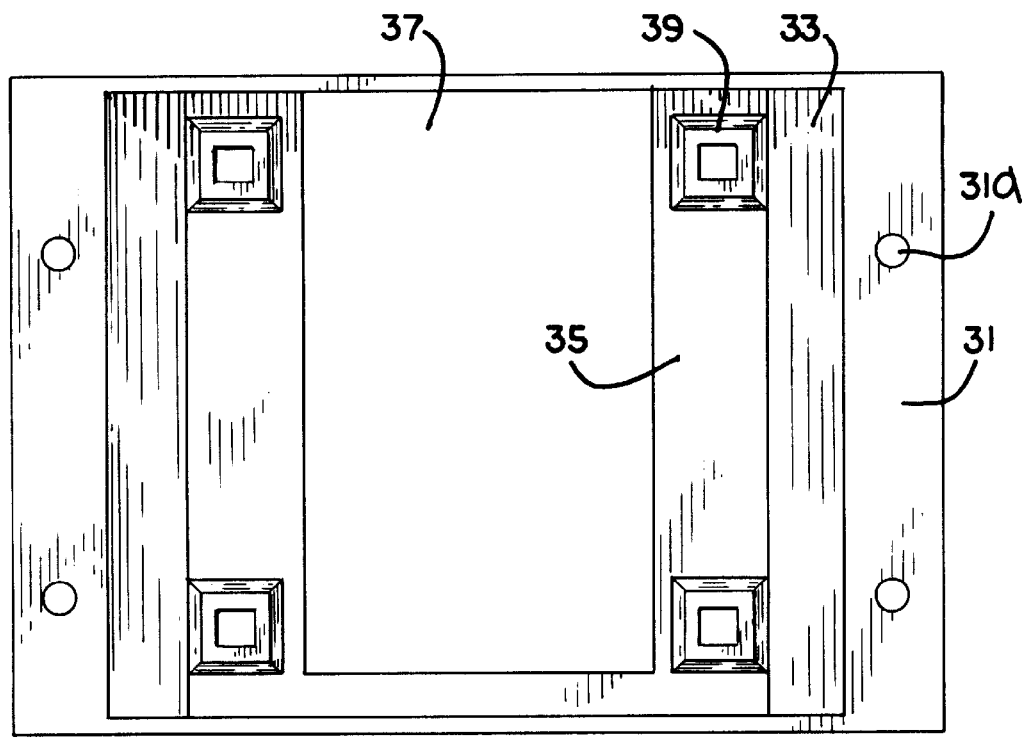
FIG. 12 is front view of a mounting member in accord with the present invention.
Figure 13:
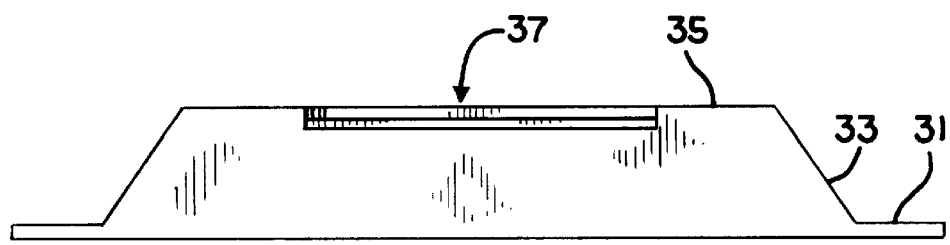
FIG. 13 is a top view of the mounting member of FIG. 12.
Figure 14:
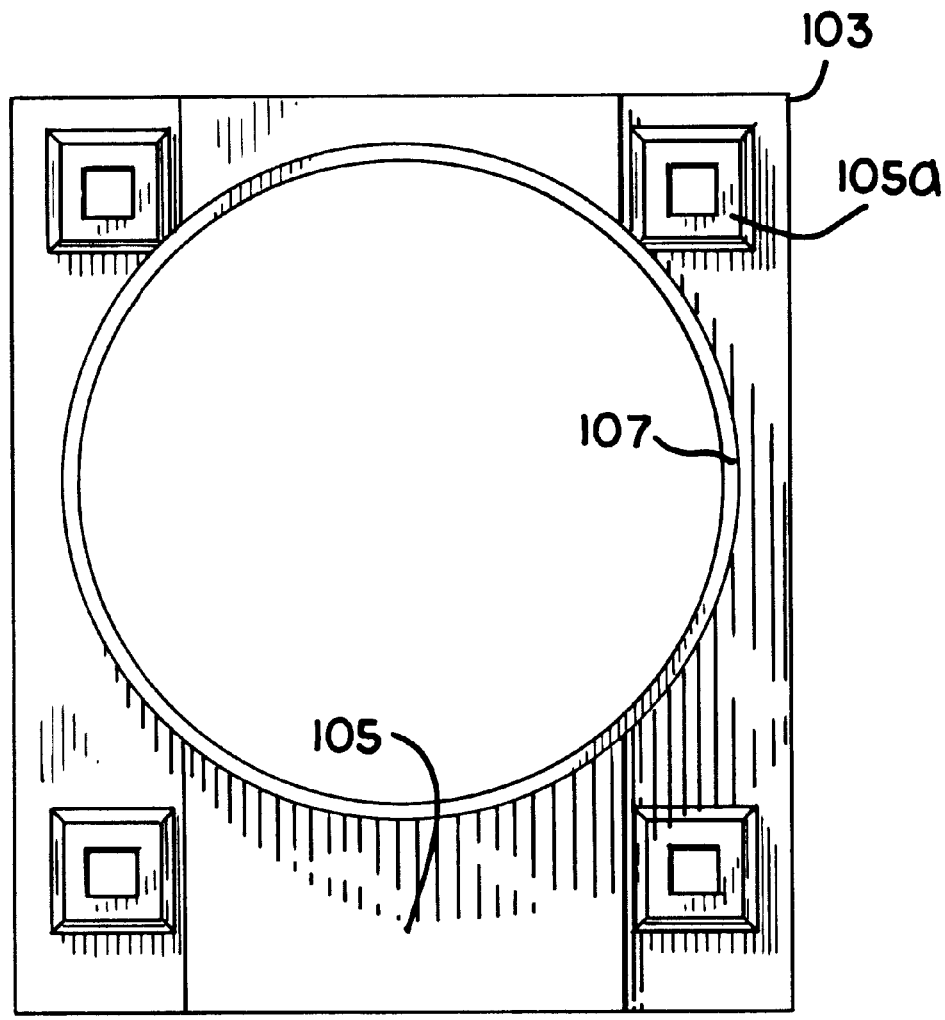
FIG. 14 is a front view of a second mounting member in accord with the present invention.
Figure 15:
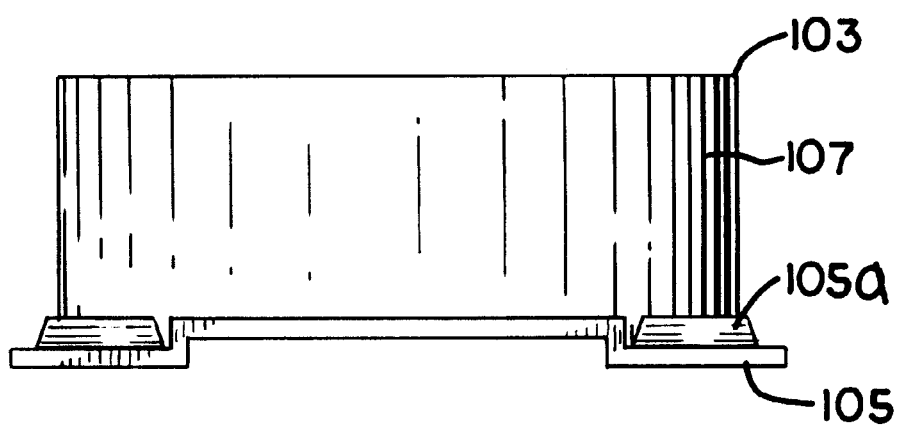
FIG. 15 is a top view of the mounting member of FIG. 14.

Mounting member 3 illustrated in FIGS. 12 and 13 is most advantageously employed in conjunction with a septic tank 11 employing a POLYLOCK™ aperture closure member which provides screw receiving areas in the tank wall surrounding the tank outlet pipe 13. These holes are in registry with preformed holes 31a in the mounting member base 31. If it is desired to install a filter system in accord with the present invention in a septic tank which does not have this aperture closure member, it may be preferable to utilize a mounting member 103 as shown in FIGS. 14 and 15. Mounting member 103 includes a generally planar base portion 105 with a projecting cylindrical body 107 adapted to be inserted into the tank outlet pipe 13 and adhesively fixed in place. Recessed apertures 105a in base portion 105 engagingly receive the resilient capture members 56 on filter housing 5 to fix the latter to mounting member 103.

Advantageously, mounting member 3 or 103, filter housing 5 and filter 7 are formed from a synthetic resin.

Figure 17:
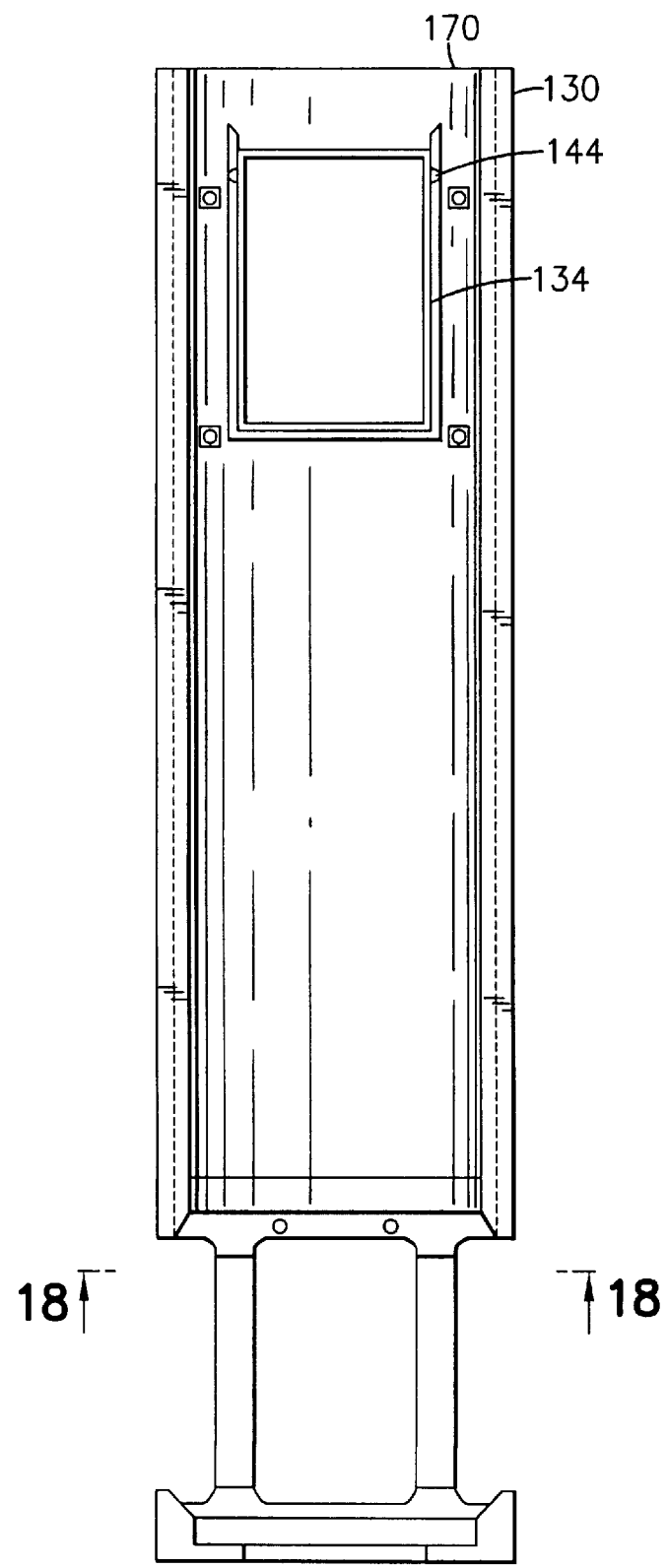
FIG. 17 is a vertical cross sectional view taken along line 17—17 of FIG. 18 of a filter housing half section.

Referring to FIG. 17, filter housing 130 is designed to attach to a septic tank wall for delivering septic tank fluid to an outlet in the septic tank wall. Outlet port 134 is designed to connect to the interior of a filter element for receiving filtered septic tank fluid from the filter element for delivering the filtered fluid to the outlet in the septic tank wall.

Figure 20:
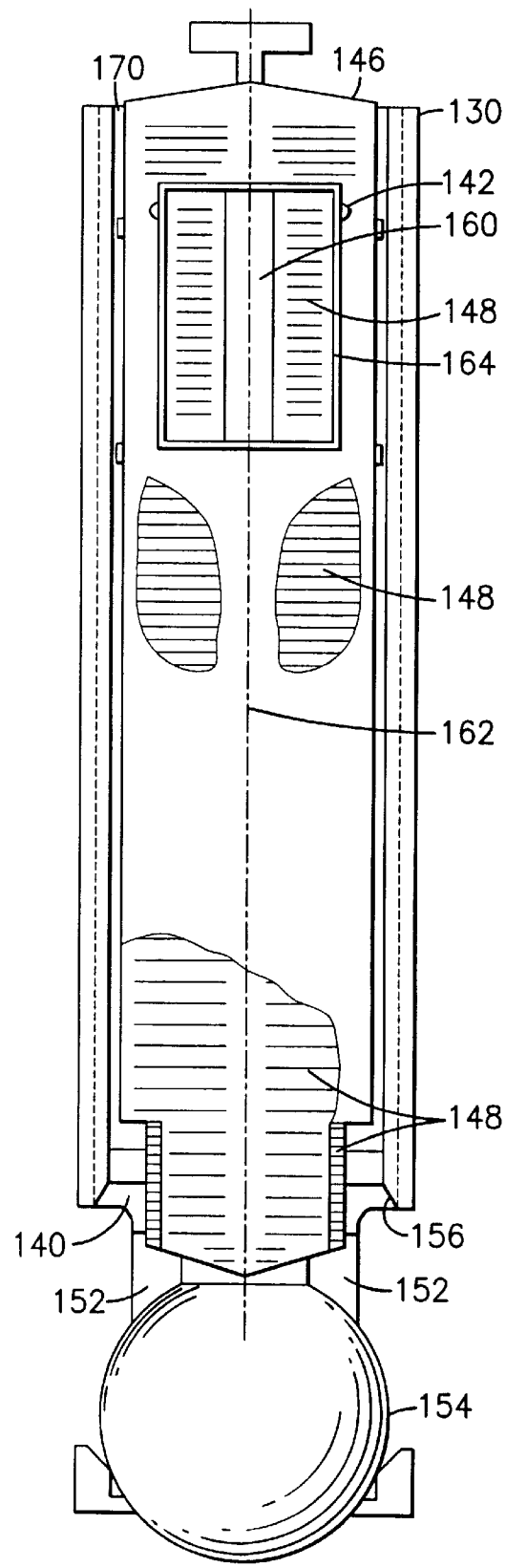
FIG. 20 is a vertical view of the filter element as a whole installed in the housing section of FIG. 17, displacing a buoyant sealing element in the form of a ball from a seal opening in the filter housing.

Referring to FIGS. 18, 19, and 20, filter element 146 installed in filter housing 130 prevents ball 154 floating up to seal seat 156 of seal opening 140 of filter housing 130. Septic tank fluid enters filter element 146 through seal opening 140 and slots 148 in the walls of filter element 146.

Protrusions 142 on the filter engage lateral grooves 144 on the filter housing, preventing ejection of the filter from the housing by buoyant forces.

Ball 154 moves vertically within the lateral confines of support bars 152.

Port 158 opening 160 connects to port 134 of the filter housing. Port 164 is designed to connect to another filter element in another filter housing when a plurality of filter housings are joined together. Preferably filter element 146 is symmetrical so that ports 158 and 164 are interchangeable when the filter element is reversed 180 degrees on axis 162 when it is inserted into housing 130 by way of opening 170 in housing 130.

Figure 21:
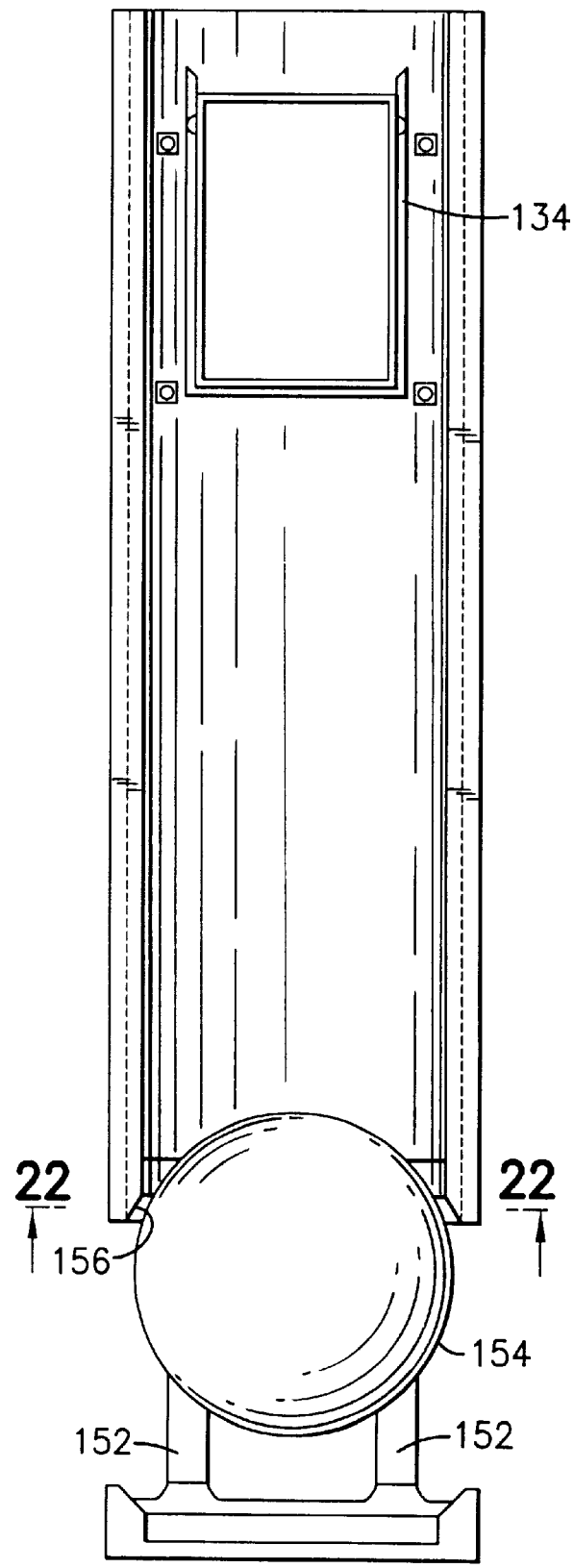
FIG. 21 is a vertical cross sectional view of the filter housing section of FIG. 17 with the filter element removed and the buoyant sealing element in the seal opening in the filter housing.

Referring to FIGS. 21, 22, and 23, filter 146 is removed from filter housing 130 permitting buoyant ball 154 to float up to seal seat 156. Protrusions 172 space the annular surface of the ball from the seal seat forming annular slot filter 178 between the ball surface and the seal seat.

Annular slot filter 178 permits use of the septic tank for a brief period, preferably about a week, filtering and passing septic tank fluid to the leeching filed and preventing back-up of the tank while a new filter element is being obtained for insertion into the filter housing.

Annular slot filter 178 is a temporary filter. In a relatively short time, waste material will build up in the slot and clog the slot filter. When a new filter element is installed in the filter housing the new filter element pushes the ball away from the seal face, separating surfaces forming the filtering passageway of the slot filter. This destroys slot filter 178 and removes built up waste material from the former area of slot filter 178.

Filter 178 has significantly less fluid flow capacity than filter 146 has when filter 146 is installed in housing 130.

Figure 24:
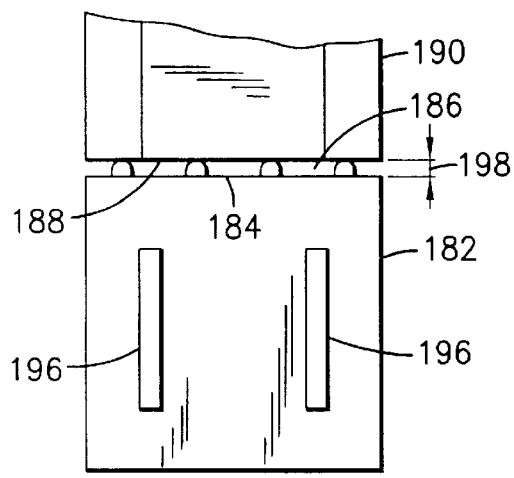
FIG. 24 is a partial vertical view of a temporary slot filter formed according to the invention.
Figure 25:
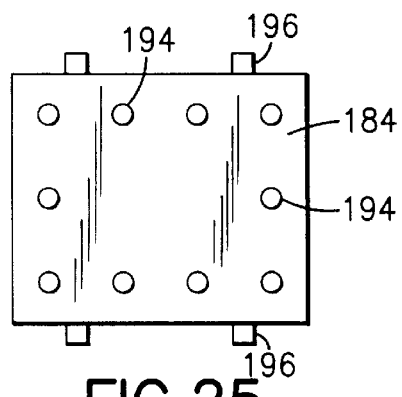
FIG. 25 is a top view of a buoyant element of the temporary slot filter of FIG. 24.

Referring to FIGS. 24 and 25, buoyant box like element 182 wall 184 forms temporary slot filter 186 with seal seat 188 of filter housing 190 when the filter element is removed from the housing. The height of bumps 194 determine the width 198 and flow capacity of the slot filter. Ridges 196 guide buoyant element 182 in vertical movement within support bars of the filter housing. The support bars are not shown.

Figure 26:
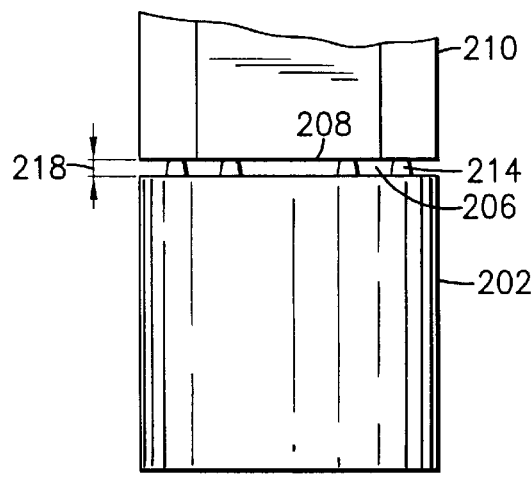
FIG. 26 is a partial vertical view of another temporary slot filter formed according to the invention.
Figure 27:
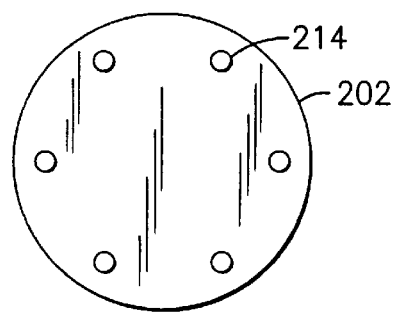
FIG. 27 is a top view of a buoyant element of the temporary slot filter of FIG. 26.

Referring to FIGS. 26 and 27, buoyant cylindrical element 202 forms temporary slot filter 206 with seal seat 208 of filter housing 210 when the filter element is removed from the housing. The height of bumps 214 determine the width 218 of the slot filter.

Figure 28:
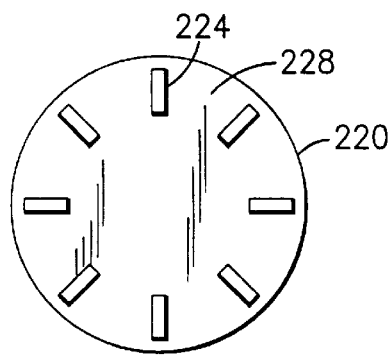
FIG. 28 is a top view of another buoyant element of a temporary slot filter of the invention.

Referring to FIG. 28, cylindrical element 220 raised ridges 224 space wall 228 from the seal seat of its respective filter housing which is not shown, to form a temporary filter of predetermined width when the cylindrical element is floated to the seal seat.

Figure 29:
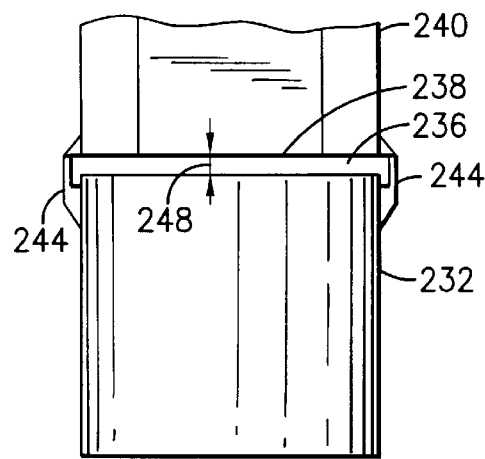
FIG. 29 is a partial view of another temporary slot filter formed according to the invention.

Referring to FIG. 29, buoyant cylindrical element 232 forms temporary slot filter 236 with seal seat 238 of filter housing 240 when the filter element which is not shown is removed from the housing. Extensions 244 mounted on element 232 lateral to seal seat 238 which contact extensions 246 on the seal housing determine the width 148 of the slot filter.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A filter system for use in a septic system tank, said filter system comprising:

a first filter housing having a first open end at the bottom of the housing for receiving septic tank fluid and a second open end configured for receiving a removable filter element when the first filter housing is mounted in a septic tank containing septic tank fluid, a first outlet port mounted on a surrounding wall of said first filter housing, means for mounting said first filter housing in a septic tank, fixed to said housing and adapted to provide a fluid flow connection between said first outlet port and an outlet in a septic tank wall, a first filter mounted in said first filter housing, a first conduit providing a fluid flow connection between the interior of said first filter and said first outlet port, said first filter housing including a defined section of said surrounding wall selectively removable to form an inlet port and means for connecting said first filter housing to a second predetermined filter housing so that the outlet port of said second predetermined filter housing is in fluid flow connection with said inlet port of said first filter housing, means for closing said first open end buoyantly responsive closingly to fluid in a septic tank when said first filter housing is mounted in a septic tank, forming a second temporary filter at said first open end when said first filter is removed from said filter housing.

2. A filter system for use in a septic system tank, said filter system comprising:

a first filter housing having a first open end at the bottom of the housing for receiving septic tank fluid and a second open end configured for receiving a removable filter element when the first filter housing is mounted in a septic tank containing septic tank fluid, a first outlet port mounted on a surrounding wall of said first filter housing, means for mounting said first filter housing in a septic tank, fixed to said housing and adapted to provide a fluid flow connection between said first outlet port and an outlet in a septic tank wall, a first filter mounted in said first filter housing, a first conduit providing a fluid flow connection between the interior of said first filter and said first outlet port, means for sealing said first open end buoyantly responsive closingly to fluid in a septic tank when said first filter housing is mounted in a septic tank, operatively connected to said filter for closing said open lower end of said filter housing and forming a temporary second filter at said first open end when said first filter is removed from said filter housing.

3. A filter system for use in a septic system tank, said filter system comprising:

a first filter housing having a first open end at the bottom of the housing for receiving septic tank fluid and a second open end configured for receiving a removable filter element when the first filter housing is mounted in a septic tank containing septic tank fluid, a first outlet port mounted on a surrounding wall of said first filter housing, means for mounting said first filter housing in a septic tank, fixed to said housing and adapted to provide a fluid flow connection between said first outlet port and an outlet in a septic tank wall, a first filter mounted in said first filter housing, a first conduit providing a fluid flow connection between the interior of said first filter and said first outlet port, means for closing said first open end buoyantly responsive closingly to fluid in a septic tank when said first filter housing is mounted in a septic tank, operatively connected to said filter for closing said open lower end of said filter housing and forming a temporary second filter at said first open end when said first filter is removed from said filter housing.

4. The filter system of claim 3 wherein said second temporary filter formed at said first open end when said first filter is removed from said filter housing is of significantly less fluid flow capacity than the fluid flow capacity of said first filter element when said first filter element is mounted in said first filter housing.

5. The filter system of claim 3 wherein at least two walls forming a filtering fluid flow passageway of said temporary second filter are moved apart by installation of said first filter in said first filter housing.

6. The filter system of claim 3 wherein at least two walls forming a filtering fluid flow passageway of said temporary second filter are moved toward one another when said first filter is removed from said filter housing.

7. The filter system of claim 6 further comprising means for spacing said at least two walls a predetermined distance apart for forming said filtering fluid flow passageway when said at least two walls are moved toward one another when said first filter is removed from said filter housing.

8. The filter system of claim 3 wherein at least two walls forming a filtering fluid flow passageway of said temporary second filter are moved toward one another to a predetermined distance apart when said first filter is removed from said filter housing.

* * * * *